Figure 1:
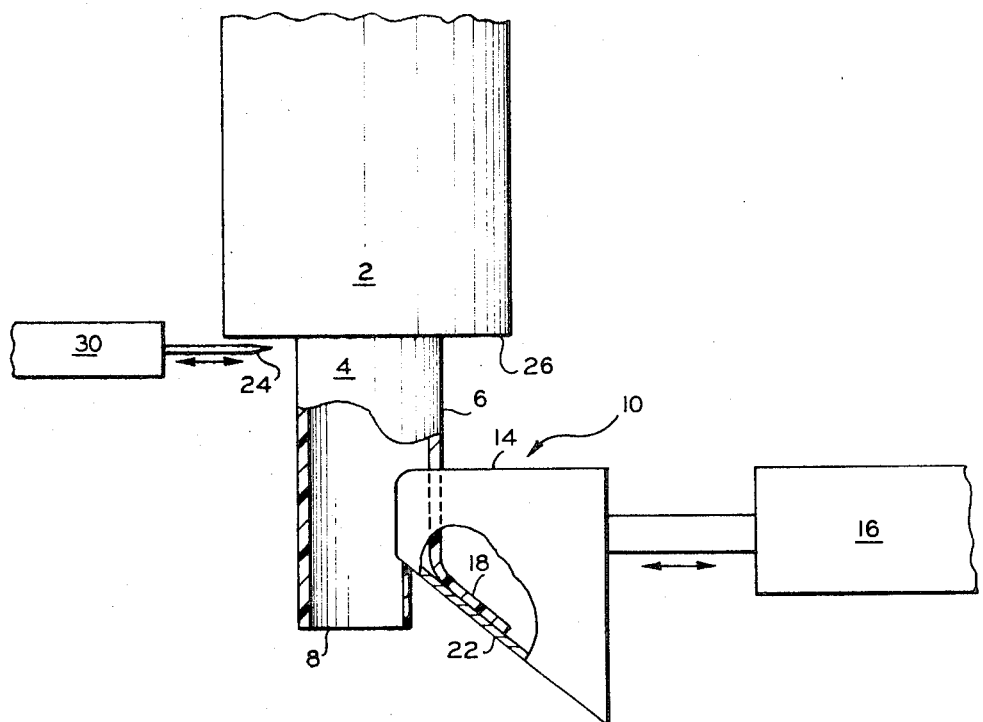

United States Patent
Cook

[15] 3,651,725
[45] Mar. 28, 1972

[54] APPARATUS AND METHOD FOR FORMING A BLOWING PIN OPENING ON A PARISON

[72] Inventor: Kenneth U. Cook, Copan, Okla.

[73] Assignee: Phillips Petroleum Company

[22] Filed: Apr. 27, 1970

[21] Appl. No.: 32,179

[52] U.S. Cl. ..................................83/165, 18/14 R, 83/184, 83/433
[51] Int. Cl. .......................................B29d 23/04
[58] Field of Search.................83/165, 184, 183, 188, 433, 83/919; 264/98, 99, 150, 154; 18/14 C, 14 R

[56] References Cited

UNITED STATES PATENTS

| 2,837,155 | 6/1958 | Cundiff et al. | 83/919 X |
| 3,308,216 | 3/1967 | Jacobs | 264/150 X |

Primary Examiner—James M. Meister
Attorney—Young and Quigg

[57] ABSTRACT

Movable first and second cutting elements are removably positioned in the pathway of a wall of a parison discharging from a die of an extruder for removing a portion of the wall of the parison at selected locations and forming a parison having an opening through the wall thereof.

6 Claims, 3 Drawing Figures

PATENTED MAR 28 1972

3,651,725

INVENTOR.
K. U. COOK
BY Young & Quigg

ATTORNEYS

APPARATUS AND METHOD FOR FORMING A BLOWING PIN OPENING ON A PARISON

This invention resides in an apparatus and a method for forming an opening in the wall of a parison. In another aspect, this invention resides in an apparatus and a method for continuously forming individual parisons having an opening on a wall of the parison adapted to receive a blow pin.

Blow molding of containers, for example, is accomplished by inserting a blow pin into the end of a parison, closing a mold about the parison, and thereafter blow molding the parison to the configuration of the mold. In some container types, it is desired that the blow pin enter the parison through a side wall of the container for forming a finished blow molded container having only one opening into a chamber of the container with said opening being through the side wall thereof. An example of such a container is a blow molded gasoline tank for vehicles.

Heretofore a single cutting element has been used to form a single slit through a wall of the parison and thereafter insert the blow pin into the parison at an angle of about 90° relative to the center line of the parison. Where a single slit is formed in the parison the after-inserted blow pin often sticks or causes pile up of material which damages the parison and sometimes after blow molding operations the opening is ill formed. These damaged resultant containers must then be discarded which causes waste of materials and labor.

It has been discovered that if the parison extruding from a die is split with spaced apart cutting elements and a portion of the wall between the cutting elements is removed, the resultant parison has an opening which is adapted to receive a blow pin through a side wall thereof without sticking and with the reduction of parison damage.

It is therefore an object of this invention to provide an apparatus and a method for forming an opening through a wall of a parison. Another aspect of this invention is to provide an apparatus and a method for intermittently removing a portion of a wall of a parison extruded from a die and cutting the extruding parison into desired lengths. Other aspects, objects, and advantages of the present invention will become apparent from a study of the disclosure, the appended claims, and the drawing.

The drawings are diagrammatic views in partial section of the apparatus of this invention and the resultant parison.

Figure 3:
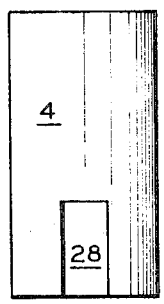
Figure 2:
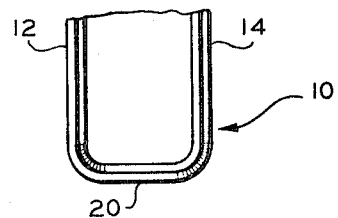

FIG. 1 shows the apparatus associated with an extrusion die with cutting elements of the apparatus severing a portion of a wall of the parison from said parison, FIG. 2 shows a top view of the cutting element, and FIG. 3 shows a resultant individual parison.

Referring to FIG. 1, a die 2 of an extruder (not shown) is continuously extruding a parison 4 for example. The parison has walls 6 and an end 8. A cutting element 10 has at least first and second spaced apart knife elements 12,14 and is movable relative to the parison 4 by a moving means 16. The moving means 16 is preferably a hydraulic cylinder attached to the knife elements 12,14 for intermittently moving said elements between a first position in which the knife elements 12,14 are laterally spaced from the parison 4 extending from the die 2 and a second position (shown) which the knife elements 12,14 are in the pathway of one wall 6 of the parison discharging from the die for cutting an opening in the parison 4. By so providing a hydraulic moving means 16, the construction of the moving means can be simple and easy to maintain while providing accurate, sensitive controls for the cutting elements 10. The distance at which the first and second knife elements are spaced one from the other is dependent upon the size of blow pin that is to be utilized with the formed parison.

The cutting elements are also provided with means for cutting and removing from the parison the portion 18 of the parison 4 between the first and second knife elements 12,14. FIG. 2 shows one embodiment of the cutting means which has a third knife element 20 that is attached to and positioned between the first and second knife elements 12,14. In order to provide a cutting surface that will remove the portion 18 of the parison 4 at the end of the cuts made by the first and second knife elements 12,14, it is preferred that the cutting edge of each of the three knife elements 12,14 and 20 be at a common elevation.

Referring to FIG. 1, a deflecting plate 22 is angularly attached between the first and second knife elements 12,14 and in the pathway of the portion 18 of the parison 4 between the knife blades in the second position of the knife blades (shown). The deflecting plate 22 contacts the portion 18 being separated from the parison 4 and directs said portion 18 downwardly and outwardly relative to the parison. It is important to keep the parison and portion separated one from the other to avoid adhesion of unwanted material to the parison.

A cutting means 24 such as a severing knife, for example, is provided for cutting in two the parison 4 issuing from the die 2. The cutting means 24 is intermittently operated for cutting the parison issuing from the die at preselected intervals thereby providing separate, individual parisons having a common length.

The knife elements 12,14 and 20 are preferably positioned at a lower elevation than the discharge end 26 of the die 2 and at the second position when the end 8 of the parison 4 being extruded is at the elevation of the knife elements. By so positioning the knife elements relative to the die and the extruding parison 4 and controlling the movement of the knife elements with the moving means 16, the opening 28 on the wall 6 of the parison 4 formed by the apparatus (better seen in FIG. 3) has its origin at the end 8 of the parison 4 and terminates at a position spaced from said end.

The cutting means 24 is preferably actuated by a hydraulic cylinder 30 as described for the knife elements. The controlling means (not shown) is connected to the moving means 16 and the cylinder 30 for actuating the cutting element 10 and the cutting means 24 at certain preselected intervals that are regulated relative to the rate of discharge of the parison 4 from the die 2.

In the operation of the apparatus of this invention, a parison is continuously or intermittently extruded from a die 2 of an extruder. The cutting elements are positioned at their second position in the pathway of the wall 6 of the parison 4 extruding from the die 2. These cutting elements are moved to the second position and there maintained by the moving means 16 that is attached to said knife or cutting elements. In the second position of the cutting elements, the end 8 of the parison is moved by the extruding parison into contact with the cutting elements and a wall portion of said parison is cut by the continuation of extrusion and movement of the end to lower elevations. At a preselected controlled interval the moving means 16 is actuated which moves the cutting elements to the second position and cuts and removes a portion 18 of the parison 4 from the continuously extruding parison thereby forming a parison with an opening formed through a wall thereof. During continuous extrusion at spaced-apart selected intervals, the cylinder 30 moves the cutting means 24 through the parison 4 to sever the parison, form an individual parison having an opening extending therethrough, and initiating a new cycle. Cutting means 24 is not needed for intermittent parison extrusion.

By so constructing an apparatus for cutting the parison discharging from the die and positioning said apparatus in close proximity with the end 26 of the die, the opening 28 can easily be formed in the parison owing to the soft, easily severed condition of the parison at that location.

Other modifications and alterations of this invention will become apparent to those skilled in the art from the foregoing discussion and accompanying drawing, and it should be understood that this invention is not to be unduly limited thereto.

What is claimed is:

1. An apparatus for forming an opening in a parison extruding from a die, comprising:
   at least first and second spaced-apart knife elements;
   means for intermittently moving the knife elements between
      the first position at which the knife elements are laterally spaced from the parison extruding from the die and a second position at which the knife elements are in the pathway of one wall of the parison discharging from the die for cutting and opening in the parison; and means for cutting and removing from the parison the portion of the parison between the first and second knife elements.

2. An apparatus, as set forth in claim 1, wherein the means for cutting and removing from the parison the portion of the parison between the first and second knife elements is a third knife element attached to and positioned between the first and second knife elements.

3. An apparatus, as set forth in claim 1, further including a means for cutting in two at spaced-apart preselected locations a parison extruding from the die.

4. An apparatus, as set forth in claim 1, wherein the means for moving the knife element between the first and second positions is a hydraulic cylinder.

5. An apparatus, as set forth in claim 1, wherein the knife elements are at a lower elevation than the discharge end of the die and at the second position when the end of the parison being extruded is at the elevation of the knife elements.

6. An apparatus, as set forth in claim 1, further including attaching a deflecting plate between the first and second knife elements in the pathway of the portion of the parison between the knife blades in the second position of the knife blades, said deflecting plate being angled downwardly and outwardly relative to the parison for directing the parison portion outwardly from the parison.

* * * * *